Nov. 7, 1944.  C. R. LIVERMON  2,361,951
TRAILER FOR BOATS
Filed Feb. 15, 1943  2 Sheets-Sheet 1
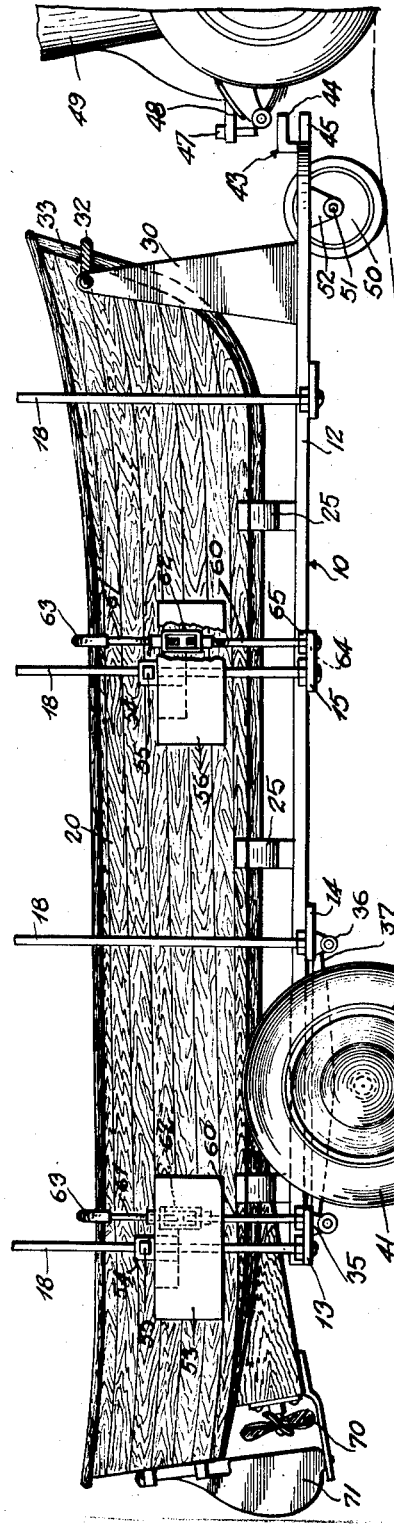
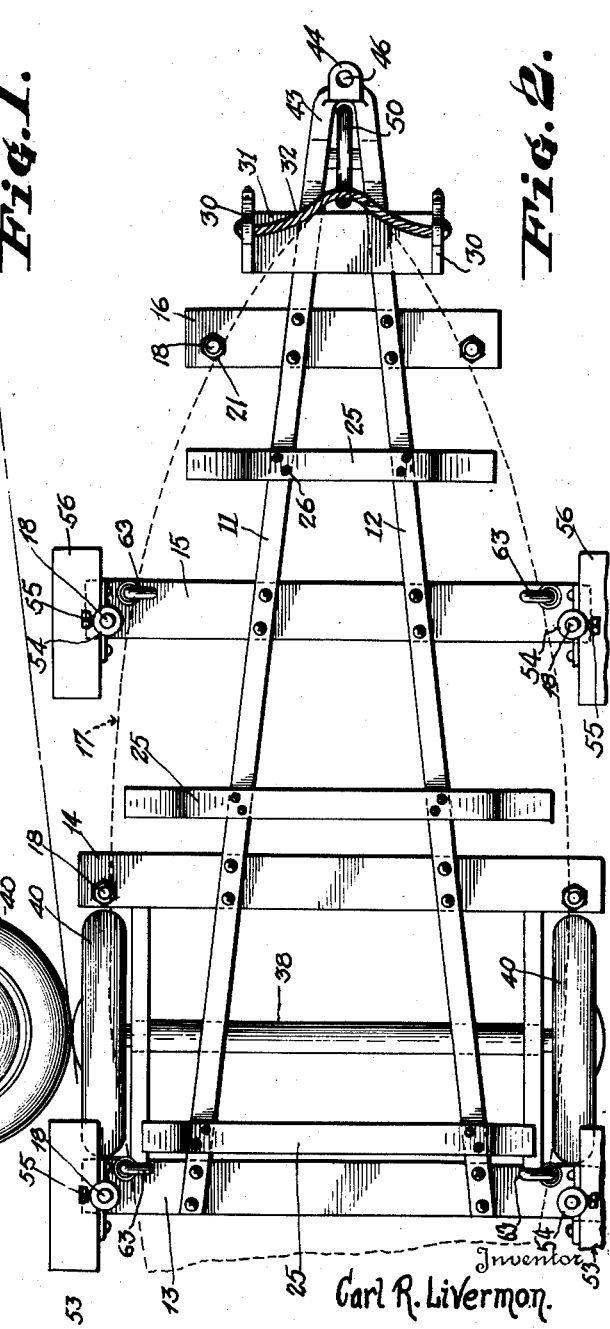
Inventor
Carl R. Livermon.
By Munn, Liddy & Glaccum
Attorney Nov. 7, 1944.  C. R. LIVERMON  2,361,951
TRAILER FOR BOATS
Filed Feb. 15, 1943  2 Sheets-Sheet 2
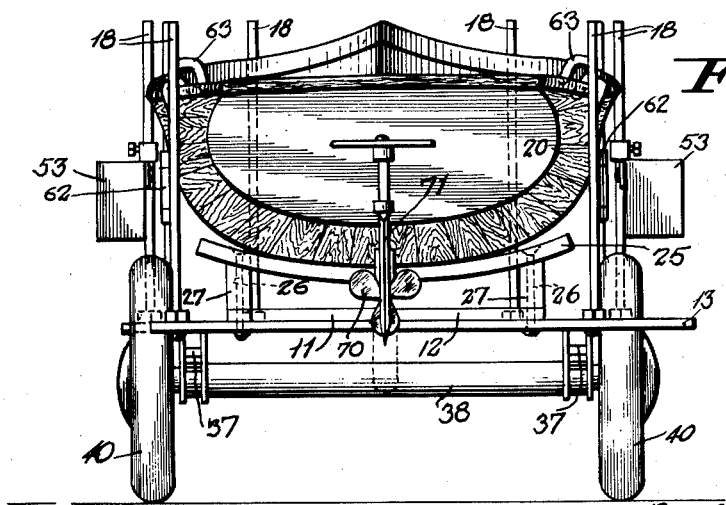
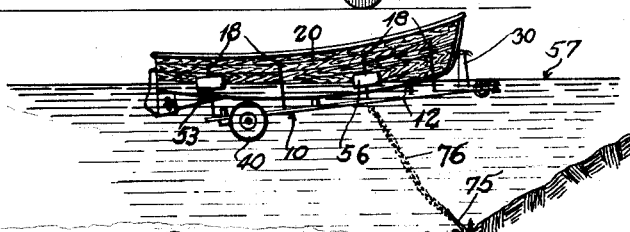
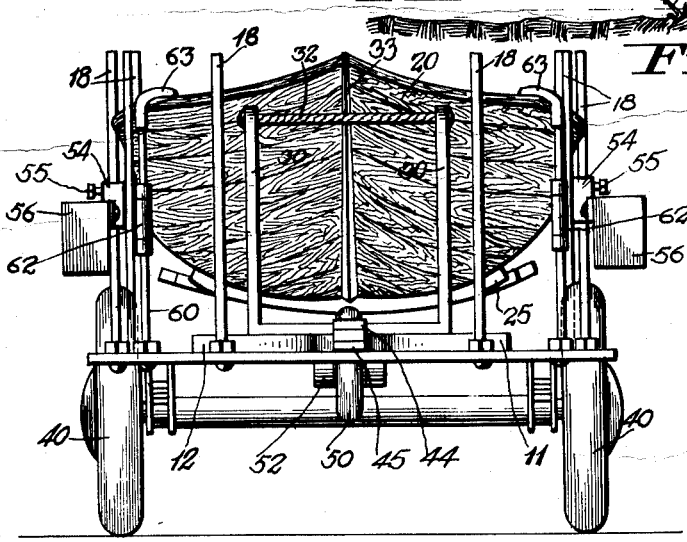
Inventor
Carl R. Livermon.
By Munn, Liddy & Glaccum
Attorney Patented Nov. 7, 1944

2,361,951

UNITED STATES PATENT OFFICE 2,361,951

TRAILER FOR BOATS

Carl R. Livermon, Roxobel, N. C.

Application February 15, 1943, Serial No. 475,991

10 Claims. (Cl. 9—1)

This invention relates to trailers for boats.

An object of the invention is the provision of a trailer having wheels so that the trailer may be attached to a vehicle for transporting a boat along the highway to a beach, said trailer being floatable whereby when the trailer has been detached from the vehicle, it can be shoved down the beach into the water and the usual power means in the boat may be employed for propelling the boat and the connected trailer to a pre-determined point in the water whence the trailer may be anchored and the boat released from its connection with the trailer.

Another object of the invention is the provision of a trailer for transporting a boat on land also into and out of the water, with an additional wheel on which to roll the trailer and boat when detached from transporting vehicle, the trailer being floatable, the power means in the boat being employed to propel the boat and connected trailer to a predetermined point in the water where the trailer may be anchored and the boat released.

Another object of the invention is the provision of a trailer for transporting boats on land also into and out of the water, with an additional wheel on which to roll the trailer and boat when detached from the transporting vehicle, with adjustable floatable means for maintaining the trailer at a pre-determined depth below the level of the water, so that the boat may be released from the trailer and then propelled under its own power after the trailer has been anchored at a pre-determined point in the water, the trailer being equipped with adjustable floats which will maintain the trailer at a pre-determined depth in the water, said depth being determined by the draft of the boat so that when the boat has been returned to the trailer it can be guided directly on to the trailer and attached thereto, power being applied for propelling the boat and likewise the attached trailer on to the beach after which the trailer may be connected to the transporting vehicle for the return trip.

A further object of the invention is the provision of a trailer for transporting a boat on land or into and out of the water, with an additional wheel on which to roll the trailer and boat when detached from the transporting vehicle, with floats to maintain a determined depth beneath the surface of the water, with anchoring means for retaining the trailer at a selected anchorage after the boat has been released and removed from the trailer, power means on the boat being employed to propel the boat and trailer to a pre-determined point in the water, whence the boat may be released and the trailer retained by means of the anchoring device.

A further object of the invention is the provision of a trailer for transporting a boat on land or into and out of the water, with an additional wheel on which to roll the trailer and boat when detached from the transporting vehicle, with floats to maintain a determined depth beneath the surface of the water, with anchoring means for retaining the trailer at a selected anchorage after the boat has been released and removed from the trailer, with a direct means for guiding the boat on to the trailer in the correct position on the trailer so the boat can be fastened to the trailer at the proper or correct position. Now that the boat has been returned to and connected on the trailer, the power plant of the boat may be employed for propelling the boat and connected trailer on to the beach, after which the trailer with the boat may be connected to a transporting vehicle.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

In the drawings:

Fig. 1 is a side view of the trailer constructed according to the principles of my invention, showing a boat supported thereton.

Fig. 2 is a plan view of the same.

Fig. 3 is a rear end view of the trailer showing the boat attached thereto.

Fig. 4 is a front end view of the trailer with the boat attached.

Fig. 5 is a side view in elevation of the connected boat and trailer, anchored in the water.

Referring more particularly to the drawings, 10 designates a frame which consists of a pair of longitudinal bars 11 and 12, which are located at an acute angle to each other. It will be noted that the bars are spaced a greater distance apart at the rear ends than at the forward ends, so that the frame tapers from the rear end to the forward end.

A plurality of transverse bars 13, 14, 15 and 16 are secured to the longitudinal bars 11 and 12 in any approved manner. These bars are of such lengths that lines drawn through points at the outer edge of the bars will be curved, as shown at 17, in Fig. 2. These lines also represent diagrammatically a plan view of a boat which is placed on a frame.

At each end of the bars 13 to 16 inclusive is secured a guide rod 18, which rises sufficiently high above the bars so that the rods will extend above the level of the water for a purpose, presently to be explained. The lower ends of these rods screw into the openings in the bars 13—16, with nuts 21 securing the rods in position. It will be noted from Fig. 2 that these rods are located along the dotted lines 17.

Spaced cradles 25 are secured by bolts 26 to the longitudinal bars 11 and 12. These cradles are curved, as shown in Figs. 3 and 4, and substantially conform to the curvature or to the shape of the bottom of the boat. These cradles may be formed of metal or they may be formed of wood, and are supported above the longitudinal bars 11 and 12 by means of posts 27 through which the bolts 26 pass, with the upper ends of the posts engaging the under faces of the cradles, and with the lower ends of the posts resting on the longitudinal bars.

A pair of resilient arms 30 rise from a base member 31 in integral formation, the base member being secured to the front ends of the bars 11 and 12. A rope 32 or other flexible member has its ends passing through perforations in the upper free ends of the arms 30, and the outer ends of member 32 are secured against slippage. The bow 33 of the boat is adapted to engage the flexible member 32 when it is in position on the trailer.

Pairs of shackles 35 and 36 are secured to the respective transverse bars 13 and 14, and these shackles support a pair of vehicle springs 37. An axle 38 is secured adjacent to its ends to the intermediate portions of the springs 37 and wheels 40 are mounted on the ends of the axle and held in place in the usual manner. These wheels are preferably of the type used on automobiles and are provided with the usual inflated casings 41.

At the forward end of the bars 11 and 12, is provided a U-shaped member 43 which has a pair of outwardly extending ears 44 and 45, and these ears are perforated as shown at 46 to receive a connecting bolt 47, carried by a tongue 48 extending rearwardly from a vehicle 49. When the trailer is transported along a road bed, the front end of the trailer is raised and the lugs 44 and 45 are placed in straddling relation with the tongue 48 after which the bolt 47 is inserted in position. The trailer is then supported at its rear end by the wheels 40.

A wheel 50 is supported by an axle 51 which is carried by brackets 52 depending from and secured to the front ends of the longitudinal bars 11 and 12, and a portion of this wheel is located between the front ends of said longitudinal bars for supporting the front end of the trailer when the trailer has been disconnected from the vehicle 49. The wheel merely supports the trailer on the ground when it is at rest or when the trailer with the attached boat 20 is moved along the beach towards the edge of the water.

A float 53 is adjustably mounted on a rod at each side of the rear end of the boat, and is adapted to aid in maintaining the rear end of the trailer below the water level 57, as shown in Fig. 5. These floats are adjusted along the rods 18 by a sleeve 54 which is received by the rod. A set screw 55 secures the float in adjusted position. The sleeve has flanges which are welded or soldered to the side of the float.

A second pair of floats 56 are adjustably mounted on rods 18 near the forward end of the trailer and are provided with sleeves 54 and nuts 55 for maintaining the adjustment of said floats.

The boat 20 is retained in position on the cradles 25, carried by the bars 11 and 12 by means of rods 60 and 61, a turnbuckle 62, and a hook 63. The lower end of each of the rods 60 is threaded into an opening 64 in the respective bars 13 and 15. A nut 65 secures each of the bars 60 against loss. It will be noted that a rod and turnbuckle arrangement is located at each side of the boat 20 so that when the hooks 63 are engaged over the upper edges of the boat, said boat will be held against movement.

The boat is provided with a power plant (not shown), for driving a propeller 70, and the usual rudder 71 extends outwardly from the stern of the boat, and is operated in the usual manner.

When it is desired to convey the boat 20 to the beach the forward end of the trailer is lifted as has been previously explained, and connected to the tongue 48 of the vehicle 49 which will transport the trailer and the connected boat to the beach. When the beach is reached, the trailer is disconnected from the vehicle so that the trailer will rest on the ground and be supported by the wheels 40 and 50. The trailer and boat are then pointed towards the water.

The operator of the boat, if other parties have placed themselves in the boat, will then push the trailer along the beach and towards the water's edge, and the trailer will be given sufficient momentum, so that the operator, when the rear end of the trailer reaches the water's edge, may enter the boat by placing his feet on an extension of the bar 13 so that it will not be necessary for the operator to walk into the water. The momentum of the trailer through the operating wheels 40 and 50 will carry the boat sufficiently into the water so that the propeller may be operated for moving the trailer and connected boat to a predetermined position on the body of the water. When the proper spot is reached, the anchor 75 which is carried by a chain 76 that connects the anchor to the trailer is lowered, and the trailer and boat will be held against movement.

The boat 20 is now ready to be released from the trailer which is supported by the various floats at a predetermined depth in the water. Of course, at this time, the boat, as shown in Fig. 5, also adds to the buoyancy of the trailer. The turnbuckles 62 are then operated for releasing the hooks 63, and the power plant which had been stopped at the time the anchor was thrown out is again put in motion for operating the propeller 70 in a reverse direction for causing the boat to move away from the trailer, or the boat may be pushed away from the trailer. The trailer at this time is then left at anchor at the particular spot where the anchor was discharged. The boat may then travel to any point desired.

After a certain time the boat is then returned to the anchored trailer, and the buoyancy of the floats is such that the guide rods 18 will always be above the level 54 in the water, so that it is possible for the operator of the boat to determine the direction the boat must take in order to enter and be properly located on the trailer. Just before the boat reaches the trailer, the engine is stopped, and the momentum of the boat will carry it between the guides until the bow 33 engages the flexible member 32, whence the boat will stop. The guides 18 aid in properly centering the boat on the trailer. The hooks 63 are then replaced and the turnbuckles are operated for securing the boat in position.

After the anchor has been withdrawn and placed in the boat, the power plant is again set in operation, and the trailer and boat are then directed towards the shore. The propeller 70 being rotated will force the boat towards the shore and can be employed for giving the boat and trailer sufficient speed so it will roll up on the beach and clear the water's edge. The propeller is stopped at the proper time and the anchor may be thrown out upon the beach to prevent the trailer from rolling backwards into the water.

The trailer is then moved by means of the wheels to the proper position so that the front end of the trailer may be again connected to the tongue 48 on the vehicle 49.

The size of the floats and their adjustments will be such that the upper ends of the rods will appear sufficiently above the water level to act as guides when the boat is returned to the trailer. Normally, the floats will be of such capacity that the trailer will be at an angle to the horizontal or with the water level as shown in Fig. 5.

The adjustability of the floats provides for the adaptation of the trailer to various drafts of boats, in that, by the adjustment of the floats the trailer can be maintained at the proper level in the water. The floats are to be of such size and are so located as to maintain the trailer at a predetermined depth in the water, and in addition they must be of such lifting capacity that should the trailer be forced below the predetermined depth the trailer will return immediately to its normal position.

I claim:

1. A floatable trailer for boats comprising a frame having wheels for supporting said frame, means for supporting a boat on the frame for transporting the boat along a road bed and beach and into the water, guides projecting upwardly from the frame for positioning the boat on the frame, and means adjustably mounted on certain of the guides for floating the frame in the water so that the guides will extend above the level of the water with the frame sufficiently below the water level that the boat can be floated into or away from the frame and guides.

2. A floatable trailer for boats comprising a frame having wheels for supporting said frame, means for supporting a boat on the frame for transporting the boat along a road bed and beach and into the water, guides projecting upwardly from the frame for positioning the boat on the frame, and means for floating the frame in the water so that the frame will be sufficiently below the water level that the boat can be floated into or away from the frame and guides, said floating means maintaining the frame at an angle to the horizontal so that the boat will readily go onto the trailer.

3. A floatable trailer for boats comprising a frame having wheels for supporting said frame, means for supporting a boat on the frame for transporting the boat along a road bed and beach and into the water, guides projecting upwardly from the frame for positioning the boat on the frame, means for securing the boat on the frame between the guides, means for floating the frame in the water so that the guides will extend above the level of the water with the frame sufficiently below the water level that the boat can be floated into or away from the frame and guides, and means for mounting the floating means at various vertical positions on certain of the guides.

4. A floatable trailer for boats comprising a frame having wheels for supporting said frame, means for supporting a boat on the frame for transporting the boat along a roadbed and beach and into the water, guides projecting upwardly from the frame for positioning the boat on the frame, said guides being spaced along the side edges of the frame in transverse pairs, means for securing the boat on the frame between the pairs of guides, and means for floating the frame in the water so that the frame will be sufficiently below the water level that the boat can be floated into or away from the frame and guides.

5. A floatable trailer for boats comprising a frame having wheels for supporting said frame, means for supporting a boat on the frame for transporting the boat along a road bed and beach and into the water, guides projecting upwardly from the frame for positioning the boat on the frames, a pair of spaced resilient arms upstanding from the front end of the trailer, a flexible means connected between the free ends of the arms and adapted to be engaged by the bow of the boat when said boat is moved onto the frame, and means for floating the frame in water so that the frame will be sufficiently below the water level that the boat can be floated into or away from the frame and guides.

6. A floatable trailer for boats comprising a frame having wheels for supporting said frame, means for supporting a boat on the frame for transporting the boat along a road bed and beach and into the water, guides projecting upwardly from the frame for positioning the boat on the frame, means for removably securing the front end of the trailer to an automobile, means for anchoring the trailer in the water at a distance from the beach, and means for floating the frame in the water so that the frame will be sufficiently below the water level that the boat can be floated into or away from the frame and guides.

7. A floatable trailer for boats comprising a frame having wheels for supporting said frame, means for supporting a boat on the frame for transporting the boat along the road bed and beach and into the water, guides projecting upwardly from the frame for positioning the boat on the frame, and a plurality of means for floating the frame in the water so that the guides will extend above the level of the water with the frame sufficiently below the water level that the boat can be floated into or away from the frame and guides, said floating means being shiftable to accommodate boats of various draft.

8. A floatable trailer for boats comprising a frame having wheels for supporting said frame, means for supporting a boat on the frame for transporting the boat along the road bed and beach and into the water, guides projecting upwardly from the frame for positioning the boat on the frame, a pair of resilient arms upstanding from the front end of the trailer, a flexible means connected between the free ends of the arms and adapted to be engaged by the bow of the boat when said boat is moved on to the frame, and a plurality of means for floating the frame in the water so that the frame will be sufficiently below the water level that the boat can be floated into or away from the frame and guides, said floating means being shiftable to vary the depth of frame below the water surface.

9. A floatable trailer for conveying a boat on land and water comprising a frame having wheels at the rear and forward ends thereof, said frame tapering from the rear to the forward end, means for floating the frame in water below the level of the water, guides for the boat rising from the side edges of the frame, the free ends of the guides adapted to project above the water level, means adapted to support the boat on the frame between the guides, and means for removably securing the said boat to the frame, said boat having a power unit for not only propelling the boat, but for propelling the attached trailer through the water.

10. A floatable trailer for conveying a boat on land and water comprising a frame having wheels at the rear and forward ends thereof, said frame tapering from the rear to the forward end, means for floating the frame in water below the level of the water, guides for the boat rising from the side edges of the frame, the free ends of the guides adapted to project above the water level, means adapted to support the boat on the frame between the guides, and means for removably securing the said boat to the frame, said boat having a power unit for not only propelling the boat, but for propelling the attached trailer through the water, means for anchoring the trailer in the water so that the boat may be removed or returned to said trailer.

CARL R. LIVERMON.